UNITED STATES PATENT OFFICE.

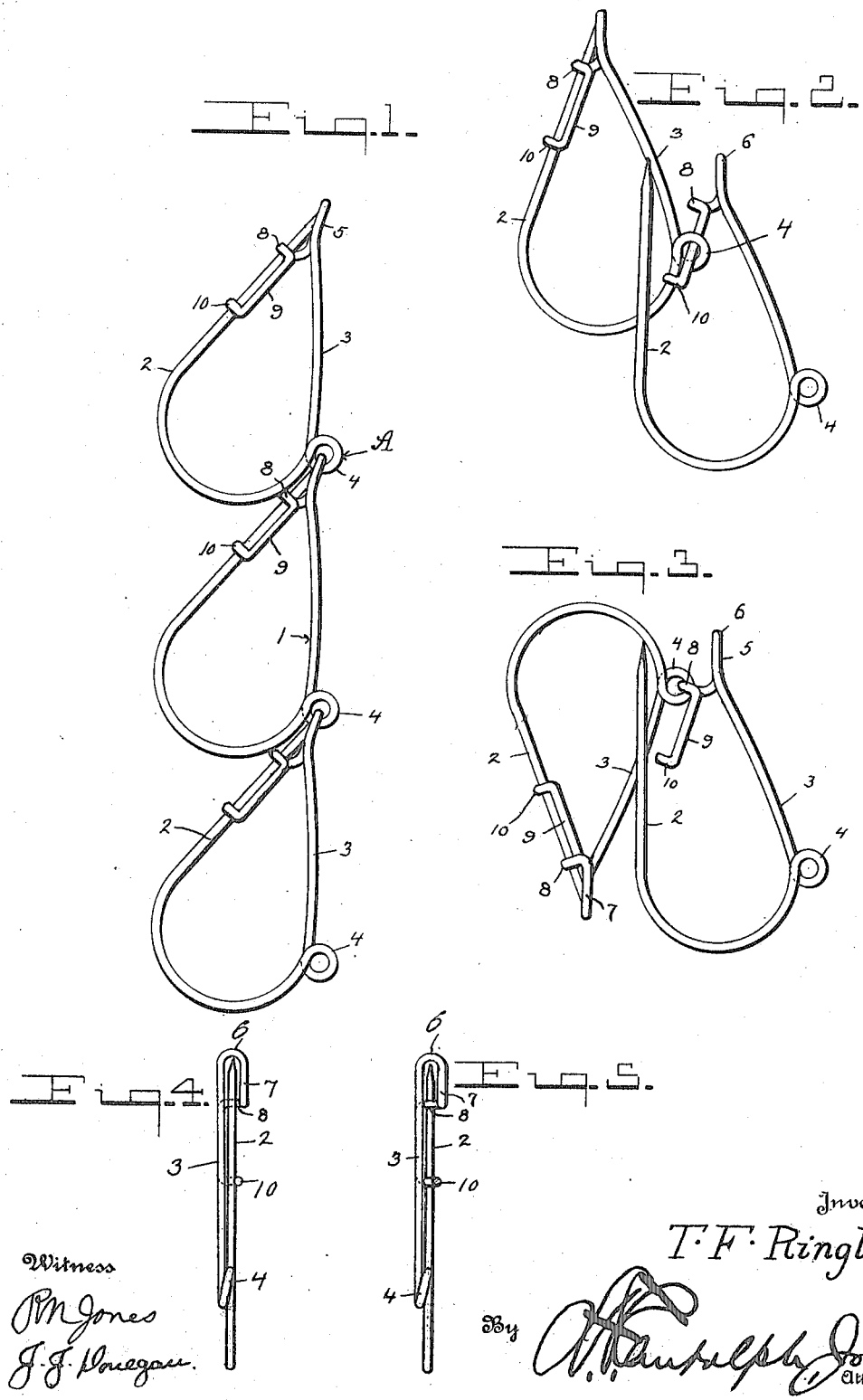

THOMAS F. RINGLE, OF TIPPECANOE, INDIANA.

FISH-STRINGER.

1,237,817.　　　　Specification of Letters Patent.　　Patented Aug. 21, 1917.

Application filed November 24, 1916. Serial No. 133,250.

*To all whom it may concern:*

Be it known that I, THOMAS F. RINGLE, a citizen of the United States, residing at Tippecanoe, in the county of Marshall, and State of Indiana, have invented certain new and useful Improvements in Fish-Stringers; and I do hereby declare the following to be a full, clear, and exact description of the invention, such as will enable others skilled in the art to which it appertains to make and use the same.

This invention relates to improvements in fish stringers of that type consisting of a series of detachably connected links, each being formed of a single piece of spring wire bent to provide a hook, and having an eye formed on the base of the shank of the hook, and a keeper formed on the free end of the shank, the free end of the shank of the hook of one link being adapted to be inserted through the eye of the shank of the hook on the preceding link, and an object of the invention is to so construct the keeper on the free end of the shank of the hook of each link that the same can be inserted through the eye on the shank of the hook on the preceding link, or withdrawn therefrom in a convenient and expeditious manner.

Other objects will appear and be better understood from that embodiment of my invention of which the following is a specification, reference being had to the accompanying drawing forming a part thereof, in which:

Figure 1 is an elevation of the stringer made up of links constructed in accordance with my invention, Fig. 2 is an elevation of a pair of links, showing the initial strip connecting one link to the preceding link, Fig. 3 is a view showing the position assumed by the preceding link when clamping the uppermost keeper on the lower link and through the eye on the shank of the preceding link, Fig. 4 is an edge elevation of one of the links with the hook portion in closed position, and Fig. 5 is an edge elevation of the link with the hook open.

Referring to the drawing in detail, the letter A designates, as an entirety, the fish stringer, which is formed of a series of detachably connected links 1, each of which is of substantially pear shape and formed of a single piece of spring wire bent upon itself to provide a straight hook portion 2 and a shank 3. The base of the shank 3 is provided with a coiled portion to provide an eye 4. The free end of the shank is offset laterally and rearwardly, as shown at 5, and then bent upon itself from the offset portion 5 to provide a curved portion 6 and then extended downwardly, as at 7, in a plane at an acute angle to the shank 3, and thence bent laterally to provide a horizontally disposed and offset U portion 8, which lies in a plane at right angles to the portion 7. The mentioned end of the shank is then extended downwardly from the U shaped portion 8, as shown at 9, and in parallelism with the portion 7 and terminally offset laterally, in a direction opposite to the offset portion forming the U-shaped portion 8, to provide a second and horizontally disposed U-shaped portion, designated 10, that is disposed in direct alinement with the U-shaped portion 8. The U-shaped portions 8 and 10 provide a pair of keepers for the reception of the pointed end of the hook 2. The links are adapted to be connected in chain formation, as shown in Fig. 1, and in connecting the links the downwardly bent portions 7 and 9 and the keepers 8 and 10 of one link are inserted through the eye 4 in the preceding link, and the adjacent curved portion 6 is then engaged in the eye 4 of the preceding link, as shown in Fig. 1. The hook 2 is adapted to be passed through the mouth of a fish and the pointed end then engaged in the keepers 8 and 10. It will be noted that the hook 2 and the shank 3 are approximately coextensive in length and that the offset portion 5 and the curved portion 6 coöperate to provide a guard for the pointed end of the hook 2, when the said pointed end is received by the keepers 8 and 10. The guard formed by the offset portion 5 and the curved portion 6 prevent protrusion of the pointed end of the hook 2, thereby preventing the pointed end from engaging in weeds or similar vegetation when the stringer is immersed in the water.

The links can be carried separately and connected in chain formation, when desired.

By extending the free end of the shank downwardly, in the manner shown in the drawing, and also forming the keepers 8 and 10 in the manner shown and described, the downwardly extended end of the shank can be inserted in the eye of the preceding link, or removed therefrom in a convenient and expeditious manner.

What I claim as new, is:

1. In a fish stringer, a series of detachably connected links, each of said links being formed of a single piece of spring wire bent upon itself to provide a hook portion and a shank portion, the said shank having an eye formed thereon and the free end of the shank being bent laterally and rearwardly at a point substantially in line with the free end of the hook and then bent downwardly to provide a guard for the reception of the free end of the hook, the mentioned end of the shank being extended downwardly and inwardly from the guard and detachably inserted through the eye on the shank of the adjacent link and having hook-receiving pieces formed thereon.

2. In a fish stringer, a series of detachably connected links, each of the links being formed of a single piece of spring wire bent upon itself to provide a straight hook portion and a shank portion, the said shank having an eye therein, the free end of the shank being bent to provide an offset guard for receiving the free end of the hook, the said end of the shank being extended downwardly and inwardly from the guard at an acute angle to the shank and adapted to be received by the eye in the shank of the adjacent link and bent laterally at spaced points into U form to provide keepers for the hook.

3. In a fish stringer, a series of detachably connected links, each of the links being formed of a single length of wire bent upon itself to provide a straight hook portion and a shank portion, said hook and shank being co-extensive in length, the said shank having an eye formed thereon, and the free end of the shank being bent laterally and rearwardly at a point substantially in line with the free end of the hook and thence bent downwardly and inwardly at an acute angle and in the direction of the hook, the said downwardly and inwardly bent portion of the shank being adapted to be inserted through the eye in the shank of the adjacent link, and having a pair of keepers formed thereon for receiving the free end of the hook.

In testimony whereof I affix my signature in presence of two witnesses.

THOMAS F. RINGLE.

Witnesses:
BERT R. RITTER,
C. M. URSCHEL.

Copies of this patent may be obtained for five cents each, by addressing the "Commissioner of Patents, Washington, D. C."